(No Model.)  3 Sheets—Sheet 1.
J. H. DOWNS.
TILTING GATE.
No. 583,568.  Patented June 1, 1897.
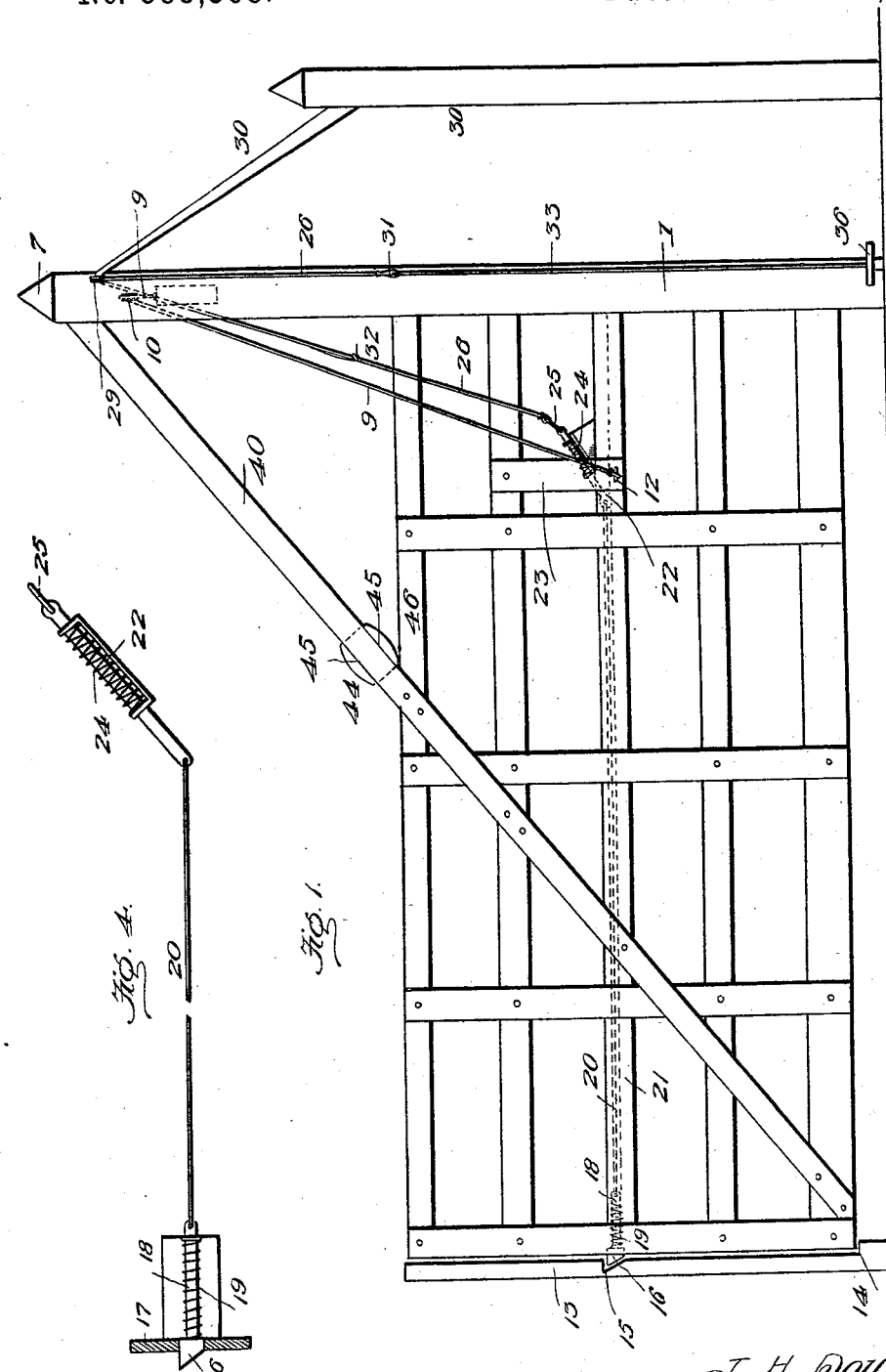

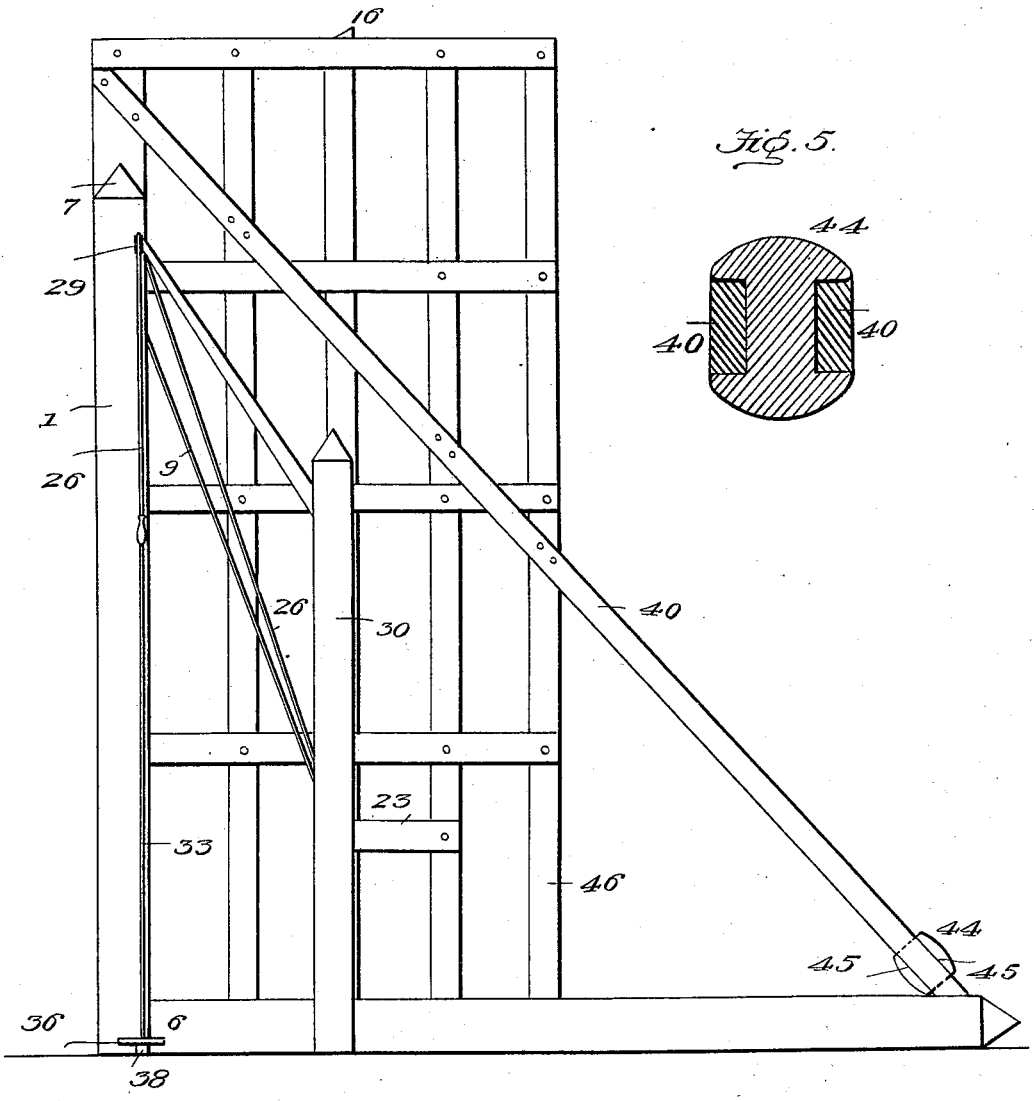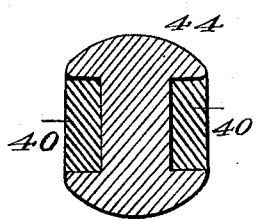

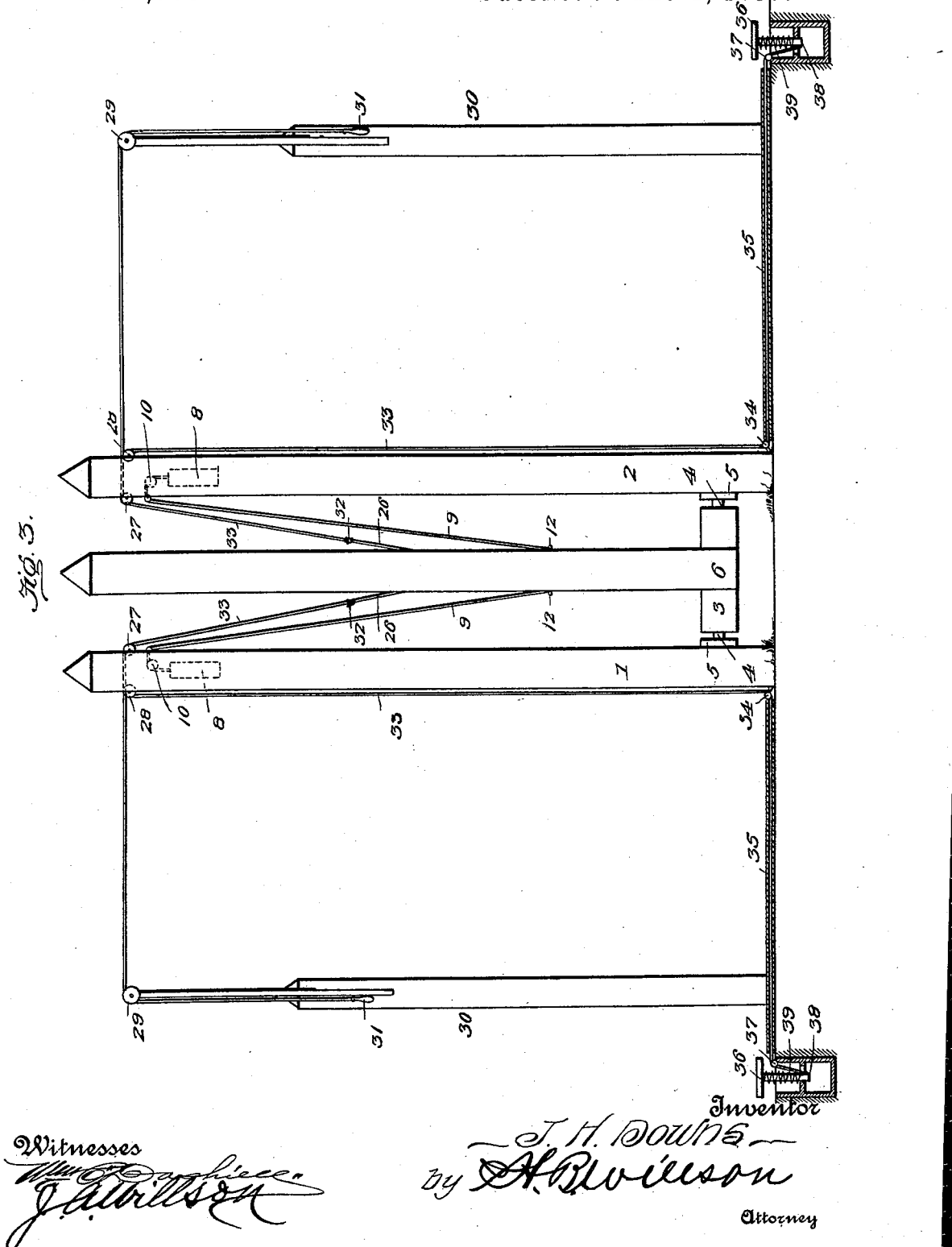

UNITED STATES PATENT OFFICE.

JOHN HENRY DOWNS, OF PITTSFIELD, MASSACHUSETTS.

TILTING GATE.

SPECIFICATION forming part of Letters Patent No. 583,568, dated June 1, 1897.

Application filed February 27, 1897. Serial No. 625,351. (No model.)

*To all whom it may concern:*

Be it known that I, JOHN HENRY DOWNS, a citizen of the United States, residing at Pittsfield, in the county of Berkshire and State of Massachusetts, have invented certain new and useful Improvements in Tilting Gates; and I do declare the following to be a full, clear, and exact description of the invention, such as will enable others skilled in the art to which it appertains to make and use the same.

My invention has relation to improvements in farm and garden gates, and more particularly to that class known as tilting gates; and the object is to provide a simple, convenient, and durable gate of this class.

To this end the novelty consists in the construction, combination, and arrangement of the same, as will be hereinafter more fully described, and particularly pointed out in the claim.

In the accompanying drawings the same reference-characters indicate the same parts of the invention.

Figure 1 is a front elevation of my improved gate as it appears when closed. Fig. 2 is a similar view showing the gate open. Fig. 3 is a rear end view of the gate closed. Fig. 4 is a side elevation of the locking devices detached from the gate, and Fig. 5 is a cross-section through the diagonal gate-brace and sliding weight.

1 and 2 represent parallel posts firmly set in the ground a sufficient distance apart to receive the transverse shaft 3 between them. The journals 4 4 of this shaft 3 have a bearing in the boxes 5 5, fixed to the adjacent faces of the posts 1 and 2. The lower rear end of the gate 6 is fixed on said shaft so that the gate may be tilted from a horizontal to a vertical position, and vice versa, as will be hereinafter more fully explained.

The main posts 1 and 2 are hollow from the ground up to the cap-piece 7, and they form housings or guideways for the weights 8, which are suspended from one end of flexible wire cords 9, passing over central pulleys 10, centrally fixed in the sides of said posts, and thence downwardly on the side of the gate, where their ends are fixed to eyebolts 12.

It will be observed by reference to Fig. 3 that each of the posts 1 and 2 is provided with a weight-pulley and a wire cord extending on each side of the gate, and the adjustment of the weights is such that they just about counterbalance the gate, thereby requiring little or no force or strength to open or close it.

13 represents a stationary fence-post the face of which opposite the gate is provided with a step 14, on which the front end of the gate rests when closed.

15 represents a retaining-notch in the post 13, which engages the bolt 16 to lock the gate when closed. This bolt 16 is mounted in a plate 17, secured to the gate, and its shank 18 is encompassed by the usual spiral spring 19 to normally project the bolt.

From an eye in the rear end of the shank 18 a wire 20 leads through a covered groove in the rail 21 to a similar eye on the guide-bolt 22, secured to the top of said rail between the short vertical braces 23. This guide-bolt is provided with the usual spiral spring 24 for projecting it, and its rear end is provided with a swivel-ring 25, from which a flexible wire cord 26 leads diagonally upward to the grooved pulley 27, mounted in the adjacent face of the post 1, thence over a second grooved pulley 28 on the opposite side of the post, thence in a horizontal line to a pulley 29 on the post 30, where it terminates in a grip-ring 31 within reach of a person on the ground.

From a point 32 on the cord 26 a second cord 33 passes over the pulleys 27 and 28, down the outside of the post 1, and under a pulley 34, through a pipe 35 to the pedal 36, where it passes over a pulley 37 and extends downward to connect with the eye on the lower end of the shank 38 of the pedal 36. The shank of this pedal is provided with the usual spiral spring 39 for restoring the pedal to its normal position after it has been depressed to operate the gate.

The system of cords, pulleys, hand-pull, and pedal just described in connection with post 1 is duplicated for post 2 and extends on the opposite side of the gate, so that the latter may be opened or closed on the approach from either side.

40 40 represent the double diagonal brace-bars, which extend rearwardly from the bottom of the front end of the gate to the upper end of the standard 42, forming the rear end of the gate.

44 represents a sliding weight provided on each side with a longitudinal rectangular groove 45, which engage said brace-bars 40, so as to allow said weight to slide by gravity from the top rail 46 of the gate between said bars to the rear standards when the gate is raised and backward again when the gate is being closed.

The operation of the gate is as follows: A person approaching the gate on foot from either direction draws down the grip-ring 31 at the post 30, thus first withdrawing the bolt 16 from the notch in the post 13, which releases the gate, when a pull on the cord raises the counterbalanced gate until the diagonal brace passes the horizontal plane, when the weight 44 slides down the brace, overbalancing the gate and causing it to assume the upright position shown in Fig. 2. If the person is in a vehicle, it is guided so that the wheel will pass over the pedal 36, which is forced downward, drawing the cord 33 with it and raising the gate, as in the first instance. After the gate has been passed the grip-ring 31 or the pedal 36 may be manipulated to close the gate, the operation being identical with that of opening it.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A tilting gate, comprising the hollow posts 1 2, provided with the bearing-boxes 5 5 on their adjacent faces, the shaft 3 journaled in said boxes, the gate-panel 6 fixed on said shaft and provided with the parallel standards 42 43 and the diagonal brace-bars 40 40 extending from the lower forward end of said gate-panel to the upper ends of said standards, the sliding weight 44 mounted on said brace-bars, in combination with the flexible wire cord 9, one end of which is connected to said gate-panel and the other end, after passing over the pulleys 10 and 11 in the hollow post, is connected to the counterbalance-weight 8 located within said hollow post, and the flexible wire cord 26, one end of which is fixed to the gate-panel and the other end after passing over the pulleys 27 and 28, extends downward and terminates in a grip-ring 31, substantially as shown and described.

In testimony whereof I hereunto affix my signature in presence of two witnesses.

JOHN HENRY DOWNS.

Witnesses:
DANIEL F. FARRELL,
FREDERICK ANDREWS.